STUART L. RIDGWAY
INVENTOR.

BY

AGENT

Oct. 26, 1965    S. L. RIDGWAY    3,214,246
EXHAUST CONTROL APPARATUS
Filed Nov. 17, 1961    4 Sheets-Sheet 4

STUART L. RIDGWAY
INVENTOR.

BY

AGENT

United States Patent Office 3,214,246
Patented Oct. 26, 1965

3,214,246
EXHAUST CONTROL APPARATUS
Stuart L. Ridgway, Topanga, Calif., assignor to TRW Inc.,
a corporation of Ohio
Filed Nov. 17, 1961, Ser. No. 153,131
16 Claims. (Cl. 23—277)

This invention relates to a method and apparatus for removing noxious matter from the exhaust gas of internal combustion engines by burning the residual combustible thereof. This is a continuation-in-part of copending application, Serial Number 677,078, filed August 8, 1957, now abandoned.

As is known, it is possible to eliminate most of the undesired constituents of the exhaust gas of an internal combustion engine by mixing the gas with air and burning the mixture. However, as the exhaust gas becomes leaner in combustible the gas must be heated to higher temperatures for combustion to take place. Since the exhaust gas often contains only a small amount of combustible (e.g., carbon monoxide, unburned and partially burned hydrocarbons, and hydrogen) combustion will not usually be supported at the normal temperatures of the gas. Catalysts have been used to maintain combustion at normal exhaust gas temperatures, but the exhaust gas usually also contains catalyst poisoning agents such as lead, leading to a short catalyst life.

Because of partial combustion within the engine, the combustible of automobile exhaust gas is highly diluted with nitrogen and products of combustion. As a result, the combustible content of the exhaust gas may be as low as 1 percent by weight. Although the exhaust gas is usually considerably above room temperature, because of the large percentage of dilutants, the gas is often at a temperature which is too low to support the rapid combustion necessary to complete combustion within an afterburner.

In dealing with flame propagation generally, present theories describe a flame or flame front in terms of diffusion of heat and reaction chain carriers from the burning or reacted gases to the unreacted combustible mixture. In a typical combustion phenomena, the temperature rise across the flame front is 2500° F. or more and the heat of combustion available is correspondingly large. However, when dealing with internal combustion engine exhaust gases, a major portion of the air-fuel mixture is burned or reacted in the engine so that there simply is not sufficient combustion heat remaining to provide a temperature rise between the burned and incompletely burned exhaust gas to ignite the diluted combustibles present. As a result, to maintain a continuous reaction, the transfer of heat of combustion from the burned exhaust gas to the incompletely burned exhaust gas must be more efficient than takes place in a normal flame front.

A still further problem exists in exhaust gas treating apparatus than has been known heretofore. Attempts at utilizing the combination of a burner and a heat exchanger have employed turbulent flow type heat exchangers in which inefficient heat exchange has been experienced, especially in view of the wide range of flow rates of the exhaust gas discharged from internal combustion engines. In ordinary automotive vehicle exhaust, such flow rates may vary from 5 to 200 c.f.m. This is particularly true in instances where such internal combustion engines are operated in a variable manner as in automotive applications, standby power plant structures and the like. Not only has the problem of poor heat exchange been encountered in such varying flow rate circumstances, but it has been additionally recognized that there is a substantial increase in engine backpressure when turbulent flow types of heat exchangers are used. Thus, optimum operation of the internal combustion engine is compromised and the high backpressure tends to prevent proper operation of the afterburner regardless of the temperature of the exhaust gas delivered thereto. This latter condition exists due to the fact that continuous combustion in an afterburner may not normally be maintained over the range of exhaust gas velocities normally encountered in automotive and the like applications since it is virtually impossible to obtain a proper air-exhaust gas ratio over the range of velocities encountered since, as the velocity of exhaust gas is increased, the engine backpressure increases which prevents the necessary air at atmospheric pressure from entering structures normally provided for this purpose. In some remote instances it may be possible to utilize a fully turbulent flow heat exchanger with an afterburner.

However, in such cases, a heat exchanger employing structure such as a set of tubes with a flow rate at Reynolds numbers greater than 2100 must be used. The size of the tubes in such a heat exchanger, to give satisfactory pressure drop and sufficient heat exchange, would have to be sufficiently large as to make the heat exchanger an impractical size for installation in an automobile. Thus turbulent flow types of heat exchangers have presented at least two major problems, the first relating to the high backpressures normally encountered in such structures and the second relating to the necessary sizes of such heat exchangers as to prevent their use in automotive applications.

In still other instances, exhaust gas treating apparatus employing afterburners have had further disadvantages in that substantially complete combustion of the combustible in the exhaust gas has not been possible except in instances where the afterburner has been made relatively large and where external means has been provided to induce and maintain combustion. Such external means has taken the form of introduction of additional fuel into the afterburner, continuous flame injection and more commonly the use of catalytic materials. All of these various prior means for maintaining combustion, in attempts toward virtually complete combustion of the combustible in the exhaust gas, have led to expensive, large, impractical and inefficient structures that have not only been incompatible in size with their proposed use in automotive applications but also have presented the recognized economic drawbacks to their adoption by the automotive industry and the general public.

Accordingly, this invention has for one of its objects the provision of an improved method and means for consuming the combustible components of the exhaust gas from an internal combustion engine without resort either to continuous heat input from external sources or to catalysts.

It is another important object of the present invention to provide apparatus for treating exhaust gases for the substantial elimination of combustible materials therein wherein a heat exchanger is used, operating at laminar flow conditions throughout a varying range of exhaust gas pressures and velocities therethrough.

It is still another important object of the present invention to provide an exhaust gas treating apparatus including a heat exchanger and an afterburner wherein means are provided for maintaining the physical size and cost at low levels while retaining the ability to effect virtually complete combustion of the combustible remaining in the internal combustion engine exhaust gases.

The foregoing and related objects are realized in accordance with the invention, by providing a novel method and apparatus for consuming unburned exhaust gas. The method and means comprise first passing unburned exhaust gas in a laminar flow countercurrent to, and in heat exchange relationship with, a laminar flow of heated, substantially completely burned exhaust gas for heating the unburned gas. Then the unburned gas thus heated is mixed with burning exhaust gas for igniting and burning the mixture. Thus there is provided a self-sustaining combustion process.

One embodiment of the apparatus includes an exhaust gas burner and a heat exchanger connected to the burner for receipt of gas therefrom and for transfer of gas thereto. The exchanger has a number of flat, substantially parallel, independent gas flow chambers arranged with adjacent chambers positioned in high thermally conductive contact with each other. Alternate chambers are connected to each other at the ends of the exchanger. There is thus provided two sets of laminar flow heat exchanger chambers. One set of exchanger chambers is connected to the burner inlet and the other set to the burner outlet. Thus, the apparatus is adapted to feed unburned exhaust gas through the exchanger into the burner, and to feed burned exhaust gas back to the exchanger in heat transfer relationship with the unburned gas for preheating the unburned gas. The laminar flow through the heat exchanger enables efficient recuperative heat exchange over the wide range of flow characteristics of the exhaust gas from the engine and the burned gas from the burner.

In another embodiment an ultraviolet light source, such as a high energy electric spark, is used to increase the combustion rate by increasing the supply of free radicals. This arrangement allows the gas to be burned at a lower temperature than would be possible without the enhancing action of the light.

The invention is described in greater detail in connection with the accompanying four sheets of drawings wherein.

Figure 1:
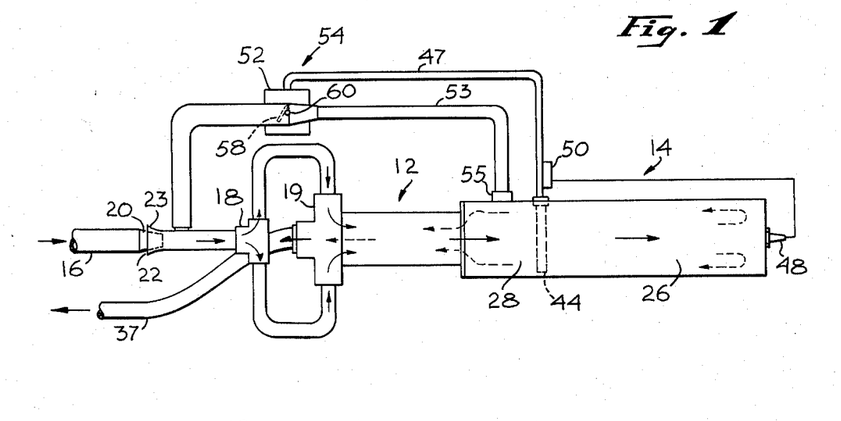
FIGURE 1 is a diagrammatic illustration of an exhaust control system according to the invention.

The exhaust control method and apparatus are herein described as applied to the elimination of the residual combustible components present in automobile exhaust gas. As illustrated in FIG. 1, exhaust gas from an internal combustion engine (not shown) is first passed through a laminar flow heat exchanger 12 for preheating the gas, then through an exhaust gas burner 14 where the combustible components of the exhaust gas are burned and thereafter conducted back through the heat exchanger. Recuperative heat exchange is obtained by passage of the exhaust gas alternately and in a laminar flow manner through one set of heat exchanger passages for deriving heat therefrom, and then, also in a laminar flow manner, through an adjacent set of heat exchanger passages for contributing heat thereto. Thus the completely reacted exhaust gas flows through and replenishes heat to the exchanger a short time after its original passage through the exchanger.

Figures 2, 10:
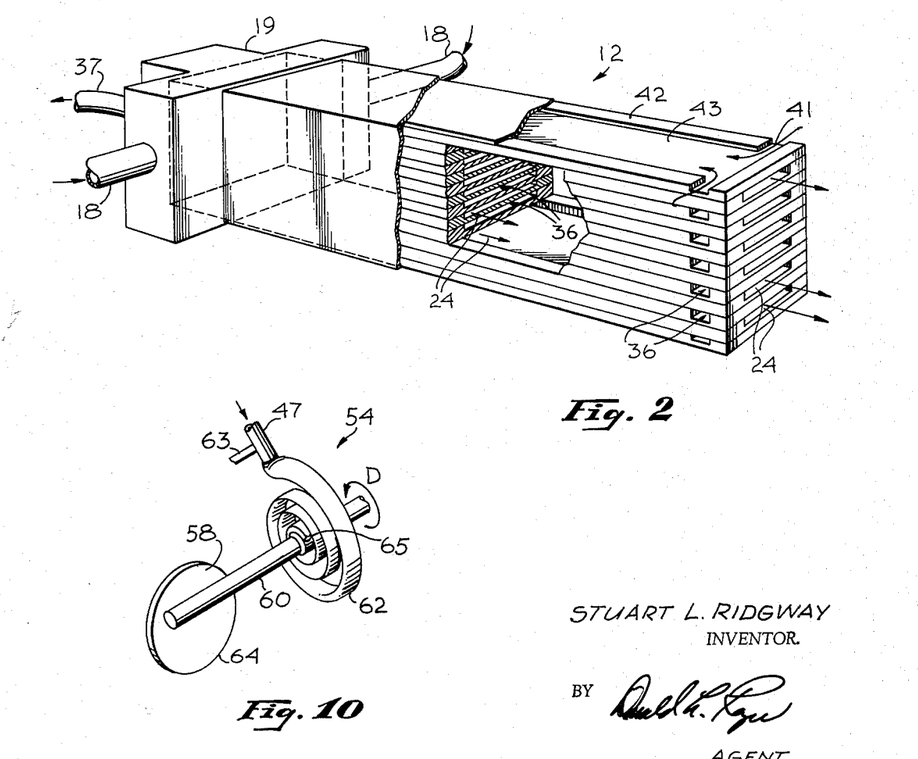
FIG. 2 is a partially cut away perspective view of the heat exchanger of the apparatus of FIGURE 1.
FIG. 10 is a perspective view illustrating the bypass control means used in the apparatus of FIG. 1.
Figure 3:
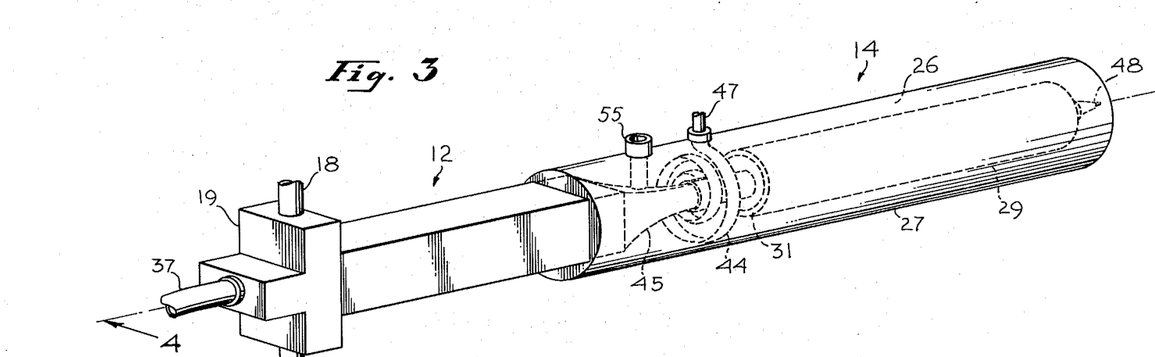
FIG. 3 is a perspective view of the heat exchanger and burner in the system of FIGURE 1.
Figure 4:
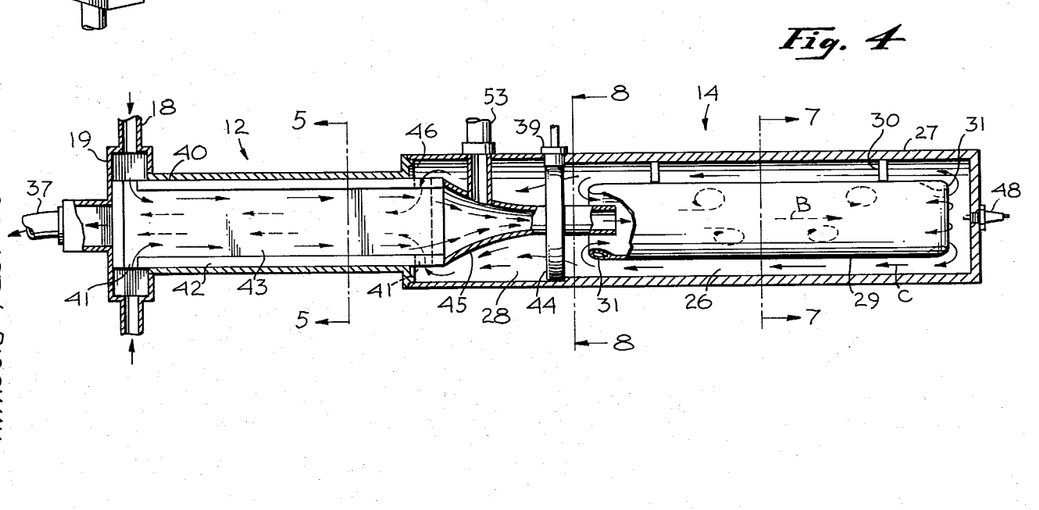
FIG. 4 is a longitudinal sectional view taken substantially along line 4—4, FIG. 3.

The method and apparatus of the invention will now be considered in detail in connection with FIG. 1, a diagrammatic illustration of the over-all exhaust system, and FIGS. 2 and 4, perspective views of, respectively, the laminar flow heat exchanger and the burner of the invention. The incompletely burned exhaust gas is fed into the system through an exhaust pipe 16, which may be the conventional exhaust pipe of an automobile. The gas is then conducted into the heat exchanger 12 through a T-shaped inlet 18 and a heat exchanger header 19. Air from the atmosphere is also drawn into the inlet 18. This is accomplished by passing the exhaust gas through a venturi 20 and drawing ambient air through an inlet 22 into the flow of exhaust gas by the partial vacuum created at a throat 23 of the venturi. In this connection, it has been found that between five and ten percent of air over a stoichiometric mixture in the final burned exhaust provides for satisfactory operation of the present system. While the venturi arrangement shown will provide the addition of air to the exhaust gas, it is to be understood that other means such as a pump may be used to supply the air to the exhaust gas.

The air-gas mixture passes through the heat exchanger 12 (FIG. 2) in a laminar flow through a first set of exchanger chambers 24 and enters into a main chamber 26 (FIG. 4) of the burner 14. Here the flow of the air-gas mixture becomes turbulent and mixed with gas burning in the main chamber 26. The turbulent flow of burning gases is then conducted into a secondary chamber 28 of the burner 14 where the burning is completed. The hot, burned gas is, in this embodiment, then conducted back through the heat exchanger 12 through a second set of exchanger chambers 36 (FIG. 2) countercurrent to the flow of incoming unburned gas in adjacent chambers 24, thus transferring a large part of the heat of the burned gas to the unburned gas. The burned gas, substantially free of combustible, passes out of the exchanger through an outlet 37 to the atmosphere.

Figure 5:
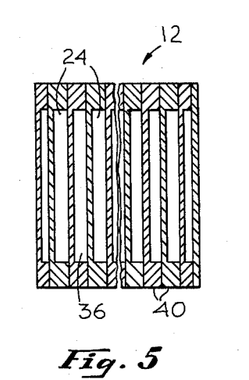
FIG. 5 is a transverse sectional view taken substantially along line 5—5, FIG. 4.
Figure 6:
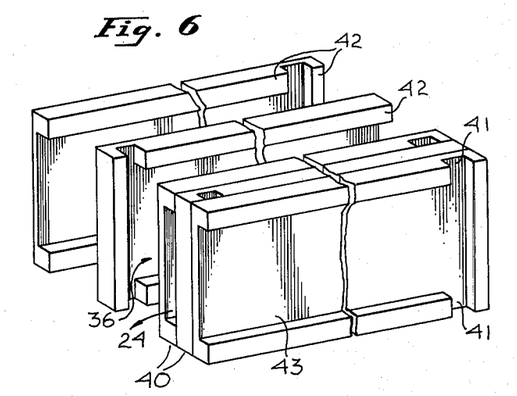
FIG. 6 is an exploded perspective view of a portion of the heat exchanger of FIG. 2.
Figure 7:
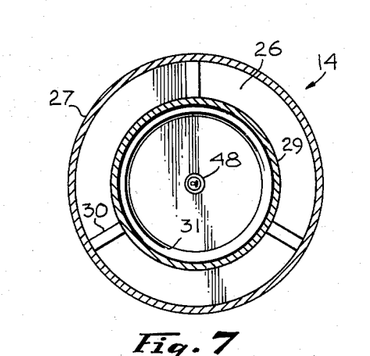
FIG. 7 is an enlarged transverse sectional view taken substantially along line 7—7, FIG. 4.
Figure 8:
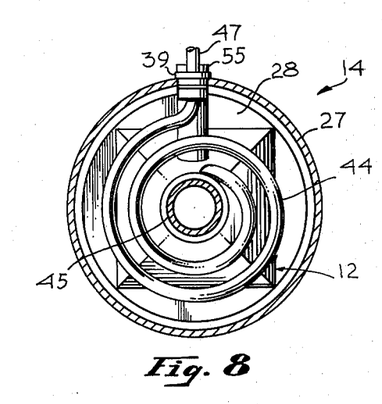
FIG. 8 is an enlarged transverse sectional view taken substantially along line 8—8, FIG. 4.

As illustrated in FIG. 2, the heat exchanger of the invention is of the recuperative type having heat conducting characteristics with a continuous flow of gases therethrough. The heat exchanger 12 is made up of a number of relatively thin, flat plates 40 (shown in greater detail in FIGS. 5 and 6) each separated from an adjacent plate by integral plate separator portions 42. The separator portions 42 are arranged in order that each heat exchanger chamber, formed by a pair of adjacent plates and the separator portions between them, has a substantially T-shaped gas flow passage through the chamber. The T-shaped gas flow passage is realized by virtue of each substantially rectangularly shaped chamber having a pair of gas inlets 41 on opposite sides of one end of the exchanger, and having a single gas outlet 43 in the other end of the exchanger. Adjacent chambers are arranged with the T-shaped passages oppositely oriented. Consequently, alternate chambers are similarly oriented.

In order to improve the efficiency of the heat exchanger 12 the two outside chambers have a smaller volume than the inside chambers. The volume of the outside chambers are preferably chosen such that the gas flow through each of the outside chambers is approximately half that through each of the inside chambers. Thus, the outside chambers each has only approximately half the heat transfer area of that of an inside chamber.

Figure 11:
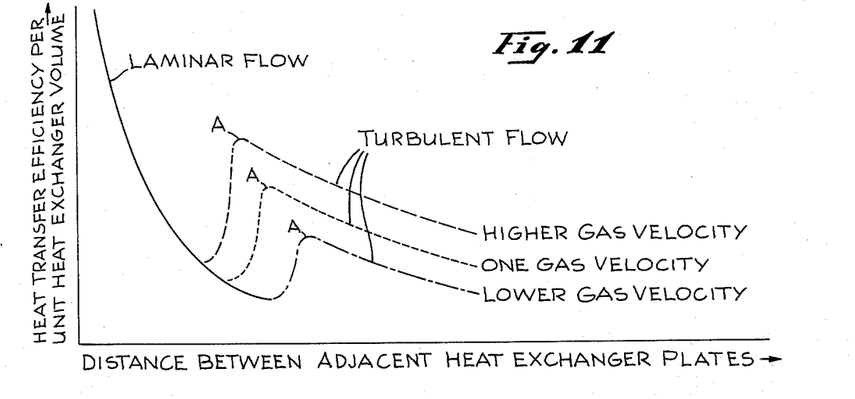
FIG. 11 is a graph illustrating an aspect of the invention.

It has been found that when the thickness of each exchanger chamber, the thickness dimension being the minimum cross-sectional dimension of each chamber, is made of the order of .050 inch, a very high efficiency of heat exchange is realized between the gases flowing in adjacent chambers. In the interest of simplicity of explanation, the thickness of each chamber 24 and 36 is illustrated out of proportion with respect to the other dimensions of the chamber. In actuality, each chamber may be approximately 80 times as wide as it is thick. The efficiency of the heat exchange is illustrated in the graph of FIG. 11 wherein the efficiency of heat transfer per unit heat exchanger volume (vertical coordinate) is plotted against the distance between adjacent heat exchanger plates (horizontal coordinate). It will be noted that while the efficiency curve is substantially different for different gas velocities when the gas flow is turbulent (turbulent flow being represented by the dashed and dot-dashed portions of the graph), the efficiency curve remains substantially constant for all velocities of gas flow when the flow is laminar (the solid line portion of the graph). The transition regions between laminar and turbulent gas flow are indicated at letters A. As shown on the graph, the efficiency of the heat transfer rises rapidly with decreasing minimum transverse dimensions. It has been found that, for practical purposes, a minimum transverse dimension of about .050 inch produces a very high heat transfer efficiency, for the variable contemplated flow rates of internal combustion engines used in automotive applications, without increasing substantially the resistance to exhaust gas flow through the chambers by an amount sufficient seriously to impede the gas flow therethrough. Such a minimum transverse dimension offers another advantage. Since the thin passages of the heat exchanger chambers are efficient dissipators of sound energy, the exchanger makes an excellent acoustical muffler. In other words, the heat exchanger itself will operate as an efficient muffler. Therefore, when the exchanger is used on an automobile, the usual automobile muffler may be eliminated.

The burner 14 (FIGS. 3, 4, and 7 to 9), according to the invention, has two burner regions or chambers: The first or main burner chamber 26 (FIG. 4) into which the unburned exhaust gas is delivered, in which combustion is initiated, and in which a mixing is effected between the incoming unburned gas and the burning gas; and the second burner chamber 28 into which the burning gas is delivered for completion of combustion. The two burner chambers are used in succession for the following reasons. A certain minimum burner size is necessary in order to maintain combustion. However, with this minimum burner size some combustible will pass through the burner unburned. For example, in one minimum size main burner chamber, 5 percent of the combustible passed through the burner unburned. One way to reduce the amount of combustible that remains unburned is to increase the volume of the burner. However, an impracticably large burner is required to reduce the proportion of combustible in the almost burned gas to an amount appreciably lower than that in the minimum size burner aforementioned. It has been found that if a second burner chamber is used to receive the hot, still burning, almost completely burned gas, and allow the gas to complete its combustion without mixing with incoming cold, unburned gas, the proportion of unburned combustible in the gas from the second burner is extremely small (of the order of 1 percent of that present in the unburned gas coming into the first burner).

The first chamber 26 (FIG. 4) is designed to mix the incoming unburned gases with the burning gases in it. For this reason the first chamber 26 is designed for maximum turbulence. While the dimensions of the first chamber would ordinarily be chosen such that the length and the diameter of the chamber are equal (so that the chamber would have a maximum volume for a given surface area) the first chamber is preferably made in an elongated form for easier accommodation on an automobile. In such a case a higher unburned exhaust gas velocity is required to achieve the desired degree of mixing. Thus, the engine which provides the unburned exhaust gas experiences a higher backpressure. It was also found that the minimum temperature required for combustion may be lowered approximately 150° F. with a threefold increase in the main burner volume.

Figure 9:
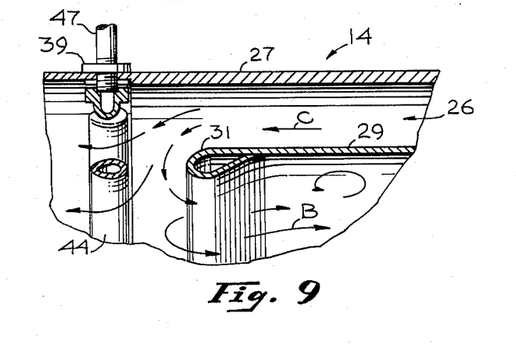
FIG. 9 is an enlarged fragmentary sectional view of a portion of the apparatus of FIG. 4.

The first burner chamber 26 (FIG. 4) has an elongated gas directing tube 29 disposed coaxially therein. The tube 29 is supported within the housing 27 of the afterburner as by support members 30 open at both ends in order that burning gas passes through the tube during its flow through the first chamber 26. The gas flow in the first chamber 26 is in a direction into the inner end of the tube 29 and through the tube in a direction B toward the outer end of the tube, then around the end of the tube and along the outside of the tube in an opposite direction C. A portion of the gas then continues in the last named direction C out of the first chamber and into the second chamber 28 while a larger part of the gas returns into the inside of the tube 29 to be recirculated. The diameter of the tube 29 is preferably chosen such that, on the average, the gas in the first chamber 26 makes a number of transits through and around the tube 29 before passing into the second chamber. The recirculation of part of the gas back into the interior of the tube 29 is illustrated in FIG. 9. As shown, ends of the tube 29 are suitably contoured as at 31 for advantageous flow conditions of the burning gas back into and through the tube 29.

The second chamber 28 (FIG. 8) is designed to reduce the concentration of combustible in the gas from the first chamber to a very low level. Gas turbulence is undesirable in the second chamber since it would allow the transport of some parts of the almost completely burned gas from the first chamber directly to the outlet 46 of the second chamber without allowing it to complete its combustion. Therefore, the second chamber 28 is designed to have substantially laminar flow of gas therethrough. A spiral stabilizing element 44 (FIGS. 8 and 9), in the form of tubing having a tear-drop contoured cross-section in planes perpendicular to the plane of the spiral, is positioned at the entrance of the second chamber 28 to act upon the turbulently flowing gas leaving the first chamber 26 and to convert this gas to a laminar flow upon entry into the second chamber. The element 44 is secured at its radially outer end to a suitable fitting 39 secured to the housing 27 of the afterburner.

The burner 14 has the input 45 and output 46 thereof adjacent to each other in order to maximize heat economy in the connections between the burner and the heat exchanger. The burner end of the heat exchanger is actually immersed in the burner. The input 45 is in the form of a generally conical heat exchanger header and serves to support a radially inner end of the element 44.

The size of the heat exchanger 12 is determined by the gas flow from the internal combustion engine with which the device is designed to operate. For use in a typical automotive vehicle the heat exchanger should have a capacity at least sufficient to heat 2.4 cubic feet of exhaust gas per second through a temperatuer rise ($\Delta T$) of 600° F. with a 500° F. average temperature differential between the unburned exhaust gas and the completely burned exhaust gas in the exchanger. Heat exchangers having a capacity of 300 B.t.u. per hour per degree F. have been found to be particularly effective in connection with the typical internal combustion engine commonly used in automotive applications. Thus the heat transfer capacity of the heat exchanger 12 must be at least matched to the heat capacity rate of the exhaust gas and to the necessary temperature rise $\Delta T$ thereacross. With the .050 inch spacings referred to, about 116 cubic inches of gas chamber volume (58 cubic inches in the incoming chambers and 58 cubic inches in the outgoing chambers) are needed to achieve this capacity. For a burner operating at a temperature of 1650° F. the volume of the main burner should be about one cubic foot. The volume of the second burner is determined by the concentration of combustible acceptable in the final output.

In order to initiate combustion within the burner 14 (FIG. 4), some form of initial ignition means must be used since the incoming exhaust gas is usually at a temperature (T) which is too cold to initiate combustion. To this end a starter for the burner is provided in the form of a spark plug 48. As soon as the combustion in the burner has been initiated, the energization of the spark plug may be discontinued. The spark plug energization may be controlled by means of a thermostatically controlled switch 50 (FIG. 1) which cuts off current flow to the spark plug 48 on detecting a self-sustaining combustion temperature such as 1650° F. in burner. The switch 50 is a pressure sensitive switch connected to a tubing 47 which has, as will be explained, a gas pressure therein representative of the temperature within the burner 14. Alternatively, catalyst means (not shown) may be disposed within the burner chamber at the start of the burning cycle to initiate the burning, and removed from the chamber after combustion has become self-sustaining, in order to preserve the life of the catalyst. The catalyst would soon become poisoned if it were allowed continuously to contact the poisoning agents usually present in the automobile exhaust gas.

According to another embodiment of the invention the main burner chamber 26 (FIG. 4) is flooded with ultraviolet light during operation of the burner. The ultraviolet light serves to increase the rate of combustion by providing an additional supply of free radicals, the free radicals being the chain carriers of combustion. Consequently, the exhaust gas requires a lower temperature for the combustion to remain self-sustaining. The ultraviolet light may be provided by means of a high energy spark gap from suitable spark means (for example, the spark plug 51 of FIG. 12) positioned within the main burner chamber 26' for scansion of the incoming exhaust gas.

It has been found that the efficiency of a heat exchanger made in accordance with the invention is high enough to provide the necessary preheating of exhaust gases entering the inlet to the heat exchanger at ordinary room temperatures. However, this efficiency may be too high under certain conditions. For example, the reduced flow of exhaust gases during idling of an automobile, coupled with the efficiency of the heat exchanger, might lead to burner temperatures high enough to damage the burner. This is so since the temperature amplification of the heat exchanger increases as the rate of gas now decreases. Therefore, means indicated generally at 54 (FIG. 1) may be provided for allowing the incoming exhaust gas at least partially to bypass the heat exchanger on the way to the burner in order to avoid preheating the unburned exhaust gas to such a temperature that excessively high temperatures would result in the burner. A thermostatically controlled bypass valve 52 is disposed in a bypass line 53 connected between the exhaust gas inlet pipe 16 to the exchanger 12 and a fitting 55 connected to the outlet header 45 from the heat exchanger, to shunt exhaust gas about the heat exchanger. Thus it may be seen that all or part of the unburned exhaust gas may be shunted directly to the burner at high burner temperatures.

The valve 54 (FIGS. 1 and 10) is in the form of a valve common on automatic chokes in automobiles. A flow control vane 58 of the valve 54 is fixed to a shaft 60 mounted for rotational movement, the rotational position of the shaft 60 thus controls the flow of gas through the bypass line 53. The valve 54 is designed to increase the flow of unburned exhaust gas through the bypass line 53 during periods of high burner temperature.

The temperature of the burner is sensed by the spiral coil 44 (FIG. 1) which forms the referenced second burner chamber vanes. The coil 44 is filled with gas under pressure and communicates, by means of a tubing connection 47 attached to the fitting 39, with a second, tightly wound, gas filled, flat spiral coil 62 (FIG. 10) made of flattened or oval-shaped tubing. The spiral coil 62 has its planes of flatness perpendicular to its planes of spiraling. The spiral coil 62 has one end 63 fixed against movement and the other end 65 fixed to the shaft 60. With high burner temperatures the pressure of the gas within both coils 44 and 62 increases causing the spiral coil 62 to unwind. Since the coil 62 is fixed against movement at the one end 63, the other end 65 moves in a direction D opening the spiral of the coil. As the spiral coil opens, the shaft 60 is rotated in the same direction D moving the vane 58 and opening the bypass valve 54. Thus, the valve 54 tends to open during periods of high burner temperature.

The rate of unburned exhaust gas flow is sensed by providing an eccentric mounting for the vane 58 (FIG. 1) of the valve 54 on the shaft 60, with the larger portion 64 of the vane extending in a direction opposite the direction of gas flow past the vane. Thus, increased rates of gas flow (and consequent lower heat exchanger temperature amplification) provide a force tending to close the valve against the spiral biasing of the spiral coil 62 (FIG. 10) while low rates of gas flow (and consequent higher exchanger amplification) tend to open the valve for shunting unburned exhaust gas around the exchanger.

Figure 12:
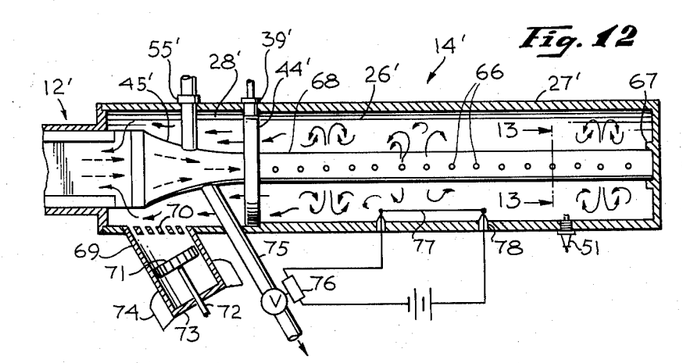
FIG. 12 is a longitudinal sectional view of an exhaust gas burner according to another embodiment of the invention.
Figure 13:
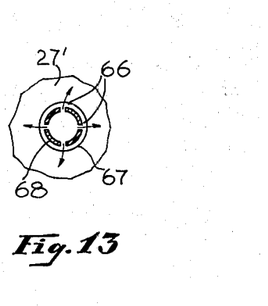
FIG. 13 is an enlarged transverse sectional view taken substantially along line 13—13, FIG. 12.

FIGS. 12 and 13 illustrate an exhaust gas burner according to another embodiment of the invention. The burner 14' of FIGS. 12 and 13 is similar to the burner 14 of FIG. 2, except for the arrangement in a first cylindrical burner chamber 26' of the burner. In the burner 14' of FIGS. 12 and 13 the required mixing of burning and unburned gases is realized in the first burner chamber 26' by feeding the incoming unburned exhaust gas into the chamber with kinetic energy in radial directions. This is effected by having the unburned gas enter the first burner chamber through radially extending orifices 66 in a pipe 68 extending along the axis of the chamber. The pipe 68 may be an extension of the header 45' and secured to the housing 27' as at 67. As in the burner 14 of FIG. 3, the unburned gas is mixed with burning gas in a turbulent flow within the first chamber 26' and then, after combustion is almost completed, enters a second burner chamber 28' for laminar flow therein to complete combustion.

As further shown in FIG. 12, a modified form of heat exchanger bypass control may be employed. As indicated, this control mechanism for the bypass valve arrangement 54 includes a tubular housing 69 that is carried by the housing 27' of the burner and positioned on an axis which intersects with one end of the heat exchanger 12. The housing 69 communicates with the interior of the after burner, there being a plurality of vanes 70 mounted along the junction between the housing 69 and the wall of the afterburner. A spiral, bimetallic, thermally responsive element 71 is positioned within and has an outer end connected to the housing 69. The inner end of the element 71 is connected to a shaft 72 that is journalled in an end wall 73 of the housing 69. The housing 69 may also be finned as at 74 for heat radiation. The shaft 72 is suitably connected to the bypass control valve 54 (FIG. 1) and controls the temperature in the heat exchanger by bypassing gases thereabout. The vanes 70 serve to prevent turbulent flow within the housing 69 and the area of the element 71 and are suitably aligned to permit radiated heat from the heat exchanger 12' to impinge upon and control operation of the element 71, shaft 72 and valve arrangement 54.

As also shown in FIG. 12, a fuse may be provided in the burner to ensure against damaging the burner under conditions of extreme burner temperatures such as may be reached by a sudden feeding of fuel directly into the burner as may be occasioned upon ignition failure in the automotive engine. For this purpose, a conduit 75 is connected to the tube 45' and extends outwardly through the housing of the afterburner 14'. A dump valve 76 is positioned in the tube 75 and is controlled by any suitable means responsive to excessive heat in the burner 14'. As shown, the valve 76 may be in the form of a normally open solenoid valve that is maintained closed upon energization. The circuit for the valve 76 includes a wire 77 carried by suitable insulators 78 and positioned within the afterburner combustion chamber. Excessive heat in the combustion chamber will thus interrupt the circuit to the valve 76 and permit this valve to open, thus passing the exhaust gases directly to atmosphere rather than into the afterburner. After such an occurrence, the wire 77 may then be replaced for continued operation.

Figure 14:
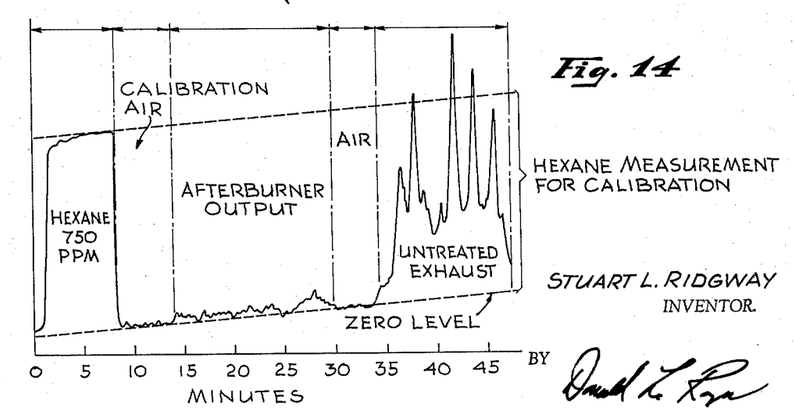
FIG. 14 is a chart illustrating operating characteristics of the apparatus of the present invention.

With reference to FIG. 14, the chart presented represents typical test characteristics of an exhaust gas treating apparatus constructed in accordance with the teachings of this invention. As shown, an automotive vehicle was operated over a period of approximately 45 minutes with the combustible contaminants in the exhaust analyzed during this time. The apparatus employed for measuring contaminant content was a Liston-Becker non-dispersive, infrared analyzer that was first calibrated by the introduction of hexane gas having a concentration in air of 750 parts per million. Additionally, normally clean air was also used to establish a zero level. It is to be noted that the output of the afterburner was extremely low and in some instances approached or equalled the zero level indicated by the calibrating air. It is also to be noted that the untreated exhaust gases contained a concentration greatly exceeding 750 parts per million.

It is thus to be noted that the apparatus of the present invention is highly efficient and reliable in operation and may be made relatively small and in the order of the size of a normal acoustical muffler employed on contemporary automotive vehicles. It is further to be noted that the apparatus of the present invention may be utilized over substantially long periods of time without service or repair, inasmuch as temperature levels are maintained at an optimum and no catalytic material is employed that may become poisoned by contaminants in the exhaust gases. The relatively small size, efficient operation, simplified construction and lack of service requirements serve to provide a relatively inexpensive exhaust gas treating apparatus.

From the foregoing, it is again apparent that the invention provides an improved method and apparatus for removing the combustible components of exhaust gas by mixing them with air and burning the mixture to produce a resulting exhaust that is free of combustible components.

I claim:

1. Apparatus for minimizing the combustible content of incompletely burned exhaust gas discharged from an internal combustion engine, comprising:
 (A) means for mixing ambient air with said exhaust gas;
 (B) a self-sustaining afterburner;
 (C) a substantially laminar flow heat exchanger having one set of passages directly connected to said afterburner for supplying the mixture of air and incompletely burned exhaust gas to said afterburner and another set of passages separate from said one of passages and directly connected to said afterburner for receiving burned exhaust gas from said afterburner;
 (D) said afterburner comprising a housing having an inlet and an outlet for respective receipt of said mixture from said heat exchanger and delivery of burned exhaust gas to said heat exchanger, said inlet and outlet being at a common inner end of said housing whereby gas burning therein is in countercurrent flow relationship with the flow of said mixture entering and initially flowing in said housing,
  gas directing means positioned within sad housing for separating the flow of said mixture from the countercurrent flow of said burning gas,
  a main burner chamber formed in the outer end of said housing,
  a secondary burner chamber formed in the inner end of said housing between said first burner chamber and said outlet,
  means for mixing at least a portion of said burning gas with said mixture in said first burner chamber.

2. Apparatus for minimizing the combustible content of incompletely burned exhaust gas discharged from an internal combustion engine, comprising:
 (A) means for mixing ambient air with said exhaust gas;
 (B) a self-sustaining afterburner;
 (C) a substantially laminar flow heat exchanger having one set of passages directly connected to said afterburner for supplying the mixture of air and incompletely burned exhaust gas to said afterburner and another set of passages separate from said one set of passages and directly connected to said afterburner for receiving burned exhaust gas from said afterburner,
 (D) said afterburner comprising a housing having an inlet and an outlet for respective receipt of said mixture from said heat exchanger and delivery of burned exhaust gas to said heat exchanger, said inlet and outlet being at a common inner end of said housing whereby gas burning therein is in countercurrent flow relationship with the flow of said mixture entering and initially flowing in said housing,
  gas directing means positioned within said housing for separating the flow of said mixture from the countercurrent flow of said burning gas,
  a main burner chamber formed in the outer end of said housing,
  a secondary burner chamber formed in the inner end of said housing between said first burner chamber and said outlet,
  means for mixng at least a portion of said burning gas with said mixture in said first burner chamber and creating a turbulent flow,
  flow stabilizing means for converting the turbulent flow in said main burner chamber to laminar flow in said secondary burner chamber.

3. Apparatus for minimizing the combustible content of incompletely burned exhaust gas discharged from an internal combustion engine, comprising:
 (A) means for mixing ambient air with said exhaust gas;
 (B) a self-sustaining afterburner;
 (C) a substantially laminar flow heat exchanger having one set of passages directly connected to said afterburner for supplying the mixture of air and incompletely burned exhaust gas to said afterburner and another set of passages separate from said one set of passages and directly connected to said afterburner for receiving burned exhaust gas from said afterburner
 (D) said afterburner comprising a housing having an inlet and an outlet for respective receipt of said mixture from said heat exchanger and delivery of burned exhaust gas to said heat exchanger, said inlet and outlet being at a common inner end of said housing whereby gas burning therein is in countercurrent flow relationship with the flow of said mixture entering and initially flowing in said housing,
  gas directing means positioned within said housing for separating the flow of said mixture from the countercurrent flow of said burning gas,
  a main burner chamber formed in the outer end of said housing,
  a secondary burner chamber formed in the inner end of said housing between said first burner chamber and said outlet,
  means for mixing at least a portion of said burning gas with said mixture in said first burner chamber, (E) a bypass line extending into said burner chamber from said mixing means,
temperature responsive control means in said bypass line for shunting a portion of said mixture directly to said burner chambers at high burner temperatures.

4. Apparatus for minimizing the combustible content of incompletely burned exhaust gas discharged from an internal combustion engine, comprising:
(A) means for introducing ambient air into said exhaust gas;
(B) a self sustaining afterburner;
(C) a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,
each of said passages having a width at least 40 times the thickness for creating a laminar gas flow when conducting gases within the predetermined range of flow rates; and
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;
(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner and said outlet to substantially complete combustion of a portion of said burning mixture.

5. Apparatus for minimizing the combustible content of incompletely burned exhaust gas discharged from an internal combustion engine, comprising:
(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction.
each of said passages having a width at least 40 times the thickness for creating a laminar gas flow when conducting gases within the predetermined range of flow rates; and
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;
(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture,
(F) temperature control means for said afterburner including,
a conduit connected to said gas directing means adjacent said inlet and extending outwardly through said housing,
a valve in said conduit,
temperature responsive means for opening said valve under conditions of extreme temperature in said burner chambers and passing the mixture directly to atmosphere.

6. Apparatus for minimizing the combustible content of incompletely burned exhaust gas discharged from an internal combustion engine, comprising;
(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,
each of said passages having a width at least 40 times the thickness for creating a laminar gas flow when conducting gases within the predetermined range of flow rates; and
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;
(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture,
said gas directing means including means in said main burner chamber for creating a turbulent flow and mixing said burning mixture with the incoming combustible mixture to sustain combustion.

7. Apparatus for minimizing the combustible content of incompletely burned exhaust gas discharged from an internal combustion engine, comprising:
(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,     each of said passages having a width at least 40 times the thickness for creating a laminar gas flow when conducting gases within the predetermined range of flow rates; and     said afterburner comprising, (D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;

(E) said housing haivng two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture,     said gas directing means including a pipe having radial orifices and extending along the axis of said main burner chamber for introducing said combustible mixture and creating a turbulent flow and mixing with said burning mixture to sustain combustion.

8. Apparatus for minimizing the combustible content of incompletely burned exhaust gas discharged from an internal combustion engine, comprising:

(A) means for introducing ambient air into said exhaust gas;

(B) a self sustaining afterburner;

(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,     each of said passages having a width at least 40 times the thickness for creating a laminar gas flow when conducting gases within the predetermined range of flow rates; and     said afterburner comprising, (D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;

(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture,     said gas directing means including a passage adjacent the inner end of said main burner chamber for recirculating and mixing the rest of said burning mixture with the incoming combustible mixture to sustain combustion;

9. Apparatus for minimizing the combustible content of incompletely burned exhaust gas discharged from an internal combustion engine, comprising:

(A) means for introducing ambient air into said exhaust gas;

(B) a self sustaining afterburner;

(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,     each of said passages having a width at least 40 times the thickness for creating a laminar gas flow when conducting gases within the predetermined range of flow rates; and     said afterburner comprising, (D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;

(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture,     said gas directing means including a passage adjacent the inner end of said main burner chamber for recirculating and mixing the rest of said burning mixture with the incoming combustible mixture to sustain combustion;

(F) flow stabilizing means positioned in said secondary burner chamber and spaced from said passage for converting the turbulent flow in said main burner chamber to laminar flow in said secondary combustion chamber;

(G) means for initiating combustion positioned in said main burner chamber.

10. Apparatus for minimizing the combustible content of incompletely burned exhaust gas discharged from an internal combustion engine, comprising:

(A) means for introducing ambient air into said exhaust gas;

(B) a self sustaining afterburner;

(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,     each of said passages having a width at least 40 times the thickness for creating a laminar gas flow when conducting gases within the predetermined range of flow rates; and     said afterburner comprising;

(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;

(E) said housing having two burner chambers including,
a main burner chamber with a gas directing tube positioned coaxially within the outer portion of said housing,
said tube being open at both ends,
said inlet extending into the inner open end of said tube for directing the flow of said combustible mixture through said tube toward the outer end to initiate burning and then directing the burning mixture in the opposite direction around said tube toward said outlet,
a secondary burner chamber positioned between the inner end of said tube and said outlet to substantially complete combustion of a portion of said burning mixture,
a passage at the open inner end of said tube for recirculating and mixing the rest of said burning mixture with the incoming combustible mixture to sustain combustion.

11. Apparatus for minimizing the combustible content of incompletely burned exhaust gas discharged from an internal combustion engine, comprising:

(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,
each of said passages having a width at least 40 times the thickness for creating a laminar gas flow when conducting gases within the predetermined range of flow rates; and
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;
(E) said housing having two burner chambers including,
a main burner chamber with a gas directing tube positioned coaxially within the outer portion of said housing,
said tube being open at both ends,
said inlet extending into the inner open end of said tube for directing the flow of said combustible mixture through said tube toward the outer end to initiate burning and then directing the burning mixture in the opposite direction around said tube toward said outlet,
a secondary burner chamber positioned between the inner end of said tube and said outlet to substantially complete combustion of a portion of said burning mixture,
a passage at the open inner end of said tube for recirculating and mixing the rest of said burning mixture with the incoming combustible mixture to sustain combustion,
(F) flow stabilizing means positioned in said secondary burner chamber and spaced from said passage for converting the turbulent flow in said main burner chamber to laminar flow in said secondary combustion chamber.

12. Apparatus for minimizing the combustible content of incompletely burned exhaust gas discharged from an internal combustion engine, comprising:

(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction,
each of said passages having a width at least 40 times the thickness for creating a laminar gas flow when conducting gases within the predetermined range of flow rates; and
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;
(E) said housing having two burner chambers including,
a main burner chamber with a gas directing tube positioned coaxially within the outer portion of said housing,
said tube being open at both ends,
said inlet extending into the inner open end of said tube for directing the flow of said combustible mixture through said tube toward the outer end to initiate burning and then directing the burning mixture in the opposite direction around said tube toward said outlet,
a secondary burner chamber positioned between the inner end of said tube and said outlet to substantially complete combustion of a portion of said burning mixture,
a passage at the open inner end of said tube for recirculating and mixing the rest of said burning mixture with the incoming combustible mixture to sustain combustion,
(F) flow stabilizing means positioned in said secondary burner chamber and spaced from said passage for converting the turbulent flow in said main burner chamber to laminar flow in said secondary combustion chamber;
(G) means for initiating combustion positioned in said main burner chamber.

13. Apparatus for minimizing the combustible content of incompletely burned exhaust gas discharged from an internal combustion engine, comprising:

(A) means for introducing ambient air into said exhaust gas;
(B) a self sustaining afterburner;
(C) and a substantially laminar flow heat exchanger having one set of alternate passages directly connected to said burner chamber for supplying the mixture of air and incompletely burned exhaust gas to said burner chamber with flow in one direction and another set of alternate passages separate from said one set of alternate passages and directly connected to said burner chamber for receiving burned exhaust gas from said burner chamber with countercurrent flow in the opposite direction;
said afterburner comprising,
(D) a housing having an inlet and an outlet for respective receipt of said mixture and delivery of substantially completely burned gas, said inlet and outlet being at a common end of said housing whereby gas burning therein is in countercurrent flow relationship with a flow of said mixture entering and initially flowing in said housing;

(E) said housing having two burner chambers including a main burner chamber with gas directing means receiving the combustible mixture from said inlet and directing the mixture in one direction toward the outer end of said housing to initiate burning and then directing the burning mixture in the opposite direction toward said outlet, a secondary burner chamber positioned between the inner end of said main burner chamber and said outlet to substantially complete combustion of a portion of said burning mixture.

14. The invention according to claim 13, wherein each of said passages having a width at least 40 times the thickness for creating a laminar gas flow when conducting gases within the predetermined range of flow rates and being of a sufficient length to provide a sonic barrier for muffling the exhaust gas flow from the engine.

15. The invention according to claim 13, wherein each of said passages having a width approximately 80 times the thickness for creating a laminar gas flow when conducting gases within the predetermined range of flow rates.

16. The invention according to claim 13, wherein said passages are formed by a plurality of spaced thin flat plates,
  each of said passages having a width at least 40 times the thickness for creating a laminar gas flow when conducting gases within the predetermined range of flow rates.

References Cited by the Examiner

UNITED STATES PATENTS

| | | | |
|---|---|---|---|
| 1,605,484 | 11/26 | Thompson et al. | 23—2.2 |
| 1,804,875 | 5/31 | Hynes | 237—9 |
| 1,848,990 | 3/32 | Boyd et al. | 23—2.2 |
| 2,517,399 | 8/50 | McCollum | 126—116 |
| 3,086,353 | 4/63 | Ridgway. | |

FOREIGN PATENTS

| | | |
|---|---|---|
| 512,829 | 7/52 | Belgium. |
| 299,178 | 8/54 | Switzerland. |

MORRIS O. WOLK, *Primary Examiner.*

MAURICE A. BRINDISI, JAMES H. TAYMAN, JR.,
*Examiners.*